(12) United States Patent
Offer

(10) Patent No.: US 8,451,880 B2
(45) Date of Patent: May 28, 2013

(54) PHASE BASED MEASUREMENT CORRECTIONS

(75) Inventor: Charles Robert Offer, Farnborough (GB)

(73) Assignee: Qinetiq Limited, London (GB)

( * ) Notice: Subject to any disclaimer, the term of this patent is extended or adjusted under 35 U.S.C. 154(b) by 986 days.

(21) Appl. No.: 12/517,825

(22) PCT Filed: Dec. 17, 2007

(86) PCT No.: PCT/GB2007/004809
§ 371 (c)(1),
(2), (4) Date: Jun. 5, 2009

(87) PCT Pub. No.: WO2008/075002
PCT Pub. Date: Jun. 26, 2008

(65) Prior Publication Data
US 2010/0166044 A1    Jul. 1, 2010

(30) Foreign Application Priority Data
Dec. 19, 2006  (GB) .................................. 0625244.9

(51) Int. Cl.
*H04B 1/00*    (2006.01)
(52) U.S. Cl.
USPC ........... 375/148; 375/136; 375/147; 375/316; 342/89
(58) Field of Classification Search
USPC .................... 375/148, 316, 136, 147; 342/89
See application file for complete search history.

(56) References Cited

U.S. PATENT DOCUMENTS

| | | | |
|---|---|---|---|
| 4,912,475 A | 3/1990 | Counselman, III | |
| 5,148,179 A | 9/1992 | Allison | |
| 5,570,097 A | 10/1996 | Aguado | |
| 5,757,646 A | 5/1998 | Talbot et al. | |
| 5,899,957 A | 5/1999 | Loomis | |
| 6,067,852 A | 5/2000 | Alber et al. | |
| 6,487,500 B2* | 11/2002 | Lemelson et al. | 701/301 |
| 6,567,041 B1 | 5/2003 | O'Dell | |
| 2004/0225438 A1 | 11/2004 | Draganov | |

OTHER PUBLICATIONS

Teunissen, "A New Method for Fast Carrier Phase Ambiguity Estimation," *Position Location and Navigation Symposium*, Apr. 1994, pp. 562-573.

Xie et al., "Integrity Design and Updated Test Results for the Stanford LAAS Integrity Monitor Testbed," *ION 57th Annual Meeting/CIGTF 20th Biennial Guidance Test Symposium*, Jun. 2001, pp. 681-693.

"Sea Based Joint Precision Approach and Landing System (JPALS) Ship System Performance Specification," *CIN: SRGPS-SPSS-0005-A*, Version 1.5, Jun. 25, 2004, ARINC Engineering Services, LLC, pp. ii-vii, 1-58.

* cited by examiner

*Primary Examiner* — Ted Wang
(74) *Attorney, Agent, or Firm* — Oliff & Berridge, PLC

(57) ABSTRACT

A method for providing correction values for phase based measurements. Where averaging techniques are employed for exploiting redundancy in multiple measurements, by constraining the phase ambiguity in a correction value to be an integer multiple of the carrier wavelength, carrier phase based measurements can be used.

8 Claims, 3 Drawing Sheets

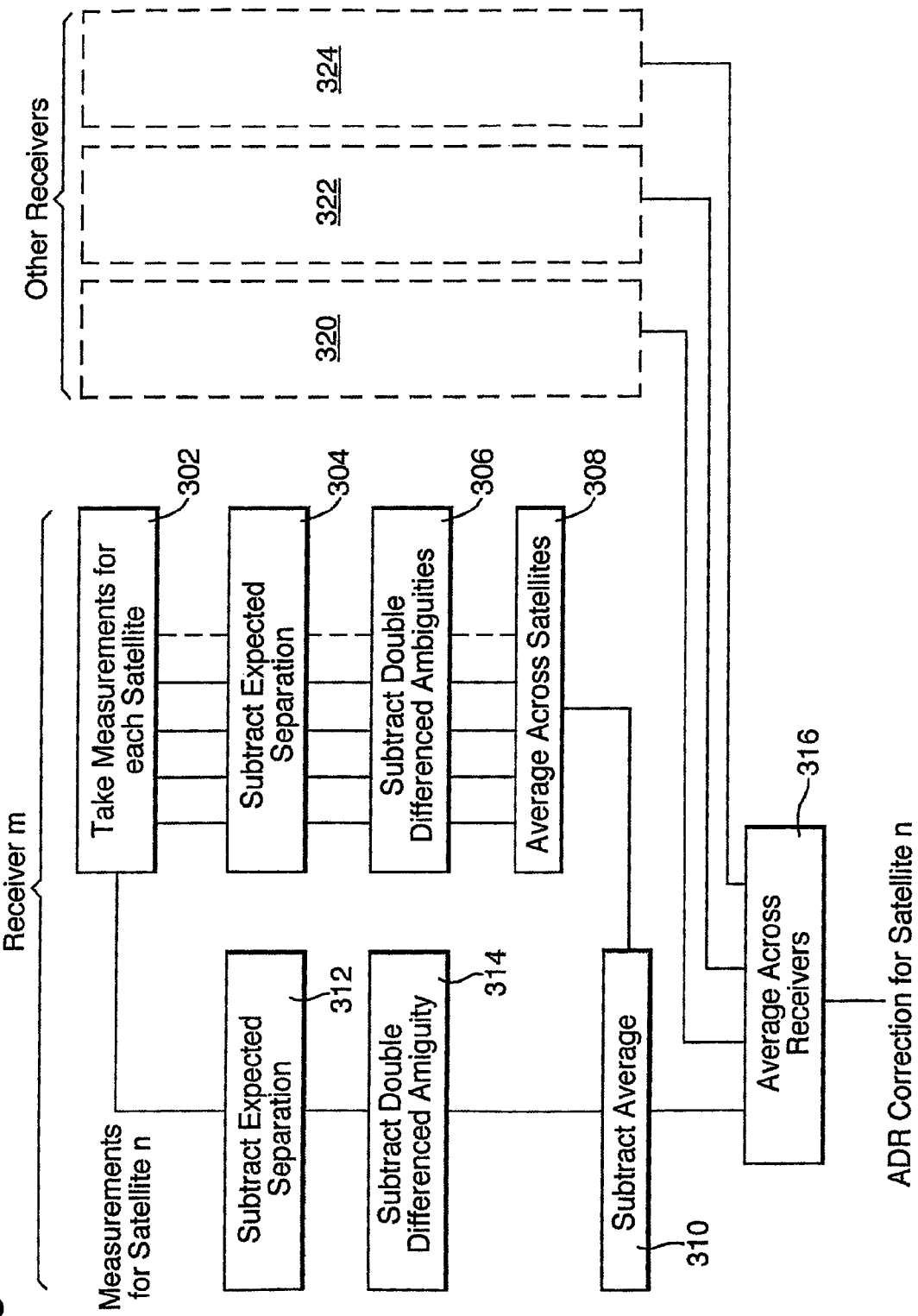

PHASE BASED MEASUREMENT CORRECTIONS

The present invention relates to a method for deriving correction values which can be used to account for spatially correlated errors in Global Navigation Satellite System (GNSS) measurements, and particularly but not exclusively to navigation of a remote vehicle such as an aircraft relative to a 'parent' vehicle such as an aircraft carrier.

BACKGROUND

Of all GNSS systems, GPS is probably the best known, and will be used as an example. Relative GPS is a known technique for providing the relative position of two objects to a greater accuracy that the absolute position of either can be found, by subtracting correlated errors from the receiver readings. Such errors include errors caused by signal delays in the ionosphere and troposphere, GPS satellite clock errors, and ephemeris errors (i.e. errors in the assumed GPS satellite positions). Differential GPS is a variant of relative GPS, where one of the objects has a known position relative to the earth.

One application of relative GPS is for landing of aircraft. This system envisages an aircraft being automatically guided through its approach and landing on a runway, using Global Positioning System (GPS) relative position measurements. The relative navigation solution required for this purpose must have a very high integrity with respect to potential failures in the system, so that the probability that the error in the relative position estimate falls outside of specified alert limits is tightly controlled.

Consequently, the technique has been extended to systems which, for reasons of integrity monitoring and robustness, collect data from several GPS 'reference' receivers mounted on a base station, which data is combined and encoded into a correction which can be transmitted to all aircraft and which allows for integrity monitoring. Such a system is the Local Area Augmentation System (LAAS), and reference is directed to G Xie, S Pullen et al., "Integrity Design and Updated Test Results for the Stanford LAAS Integrity Monitor Testbed", ION 57th Annual Meeting pp. 681-693 (June 2001). These corrections can be used to partially eliminate the correlated errors from the remote vehicle measurements and thus deduce an accurate relative position. Redundancy in the data, due to the multiple reference receivers, allows integrity monitoring of the corrections before transmission. Furthermore, random errors in the base station measurements may be reduced by averaging over the reference receivers.

One method of combining GPS measurements from multiple reference receivers is based on a priori knowledge of the reference receiver locations, for example by accurate surveying. In certain situations, eg an aircraft carrier, it is not possible to determine the exact reference positions for the receivers, however techniques have been proposed whereby an initial estimate of position is used, which is subsequently cancelled out by subtraction when calculating relative positions or vectors. When the base station is mobile, the corresponding corrections allow remote vehicle position relative to the centroid of reference receivers, or relative to a central reference point, to be deduced.

Such prior art systems use code pseudorange (or carrier-smoothed pseudorange) measurements. Such measurements are amenable to the averaging process used in deriving a single set of corrections from multiple base station receivers.

It is known that greater accuracy can be achieved by using GPS carrier phase measurements, also called Accumulated Doppler (or Delta) Range (ADR). ADR measurements include an 'ambiguity', an unknown integer multiple of the GPS carrier wavelength. It is often possible to deduce or fix this ambiguity, by using the knowledge that it takes discrete values, which allows an increased accuracy relative position estimate.

This ambiguity in ADR measurements however, presents a problem when attempting to combine multiple measurements, and the application of the prior art code pseudorange techniques to ADR measurements has proved problematic. A further difficulty associated with the application of prior art techniques to ADR measurements is that ambiguity values are specific to satellite-receiver pairs: should the common set of satellites and reference receivers being used in a system change (for example failure of a receiver or a satellite passing out of view), ambiguity values in the corrections may also change resulting in a 'cycle slip'.

It is therefore an object of the present invention to provide an improved method of deriving GPS correction values.

SUMMARY OF THE INVENTION

In a first aspect therefore, the invention provides a method for deriving a correction value $A_n$ for a phase-based satellite navigation measurement for a satellite n, from a common set of a plurality of base station reference receivers M and a plurality of satellites N, wherein the phase ambiguity $a_n$ in the correction value is constrained to be an integer multiple of the carrier wavelength $\lambda$.

In this way, a single phase-based correction value can be produced which can exploit the integrity and robustness of multiple receiver systems, thus providing values having improved accuracy and integrity.

In one embodiment component correction values A' are averaged over all base station receivers and all satellites in the common set, and double differenced ambiguities $\delta a$ are subtracted from each component correction value prior to averaging. It has been found that this is a convenient method for providing a solution of appropriate form.

It has been found that by providing a correction value by combining a plurality of phase-based satellite measurements in this way, it is possible to form a GPS or satellite navigation estimate of the position of an object relative to an average of the base station reference receiver positions to a very high accuracy. Such an estimate can be determined without requiring information on the relative geometry of the base station reference receivers, which information is typically a source of significant errors. The estimate can subsequently be transformed in order to provide a position relative to a selected point on the base station, using knowledge of the receiver geometry.

In this way, the overall error in an estimate is minimised, and accordingly in a further aspect of the invention there is provided a method of deriving a satellite navigation estimate for an object relative to a plurality of base station reference receivers, the method comprising deriving a first estimate of the position of said object relative to an average position of said reference receivers, and deriving a second estimate of position or said object relative to a selected base station reference point, based on said first estimate.

Preferably deriving said first estimate includes ambiguity fixing, and more preferably includes deriving GPS or satellite measurement correction values.

A still further aspect of the invention provides a method for deriving a correction value $A_n$ for a phase-based measurement of separation of a transmission source n, from a common set of a plurality of reference stations M, where the reference stations each make phase based measurements of distance from a plurality of transmission sources N, wherein the phase ambiguity $a_n$ in the correction value is constrained to be an integer multiple of the carrier wavelength $\lambda$.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:

BRIEF DESCRIPTION OF DRAWINGS

FIG. 3 is a block diagram showing a method of correction derivation with ambiguity compensation.

DETAILED DESCRIPTION OF THE EMBODIMENTS

Figure 1:
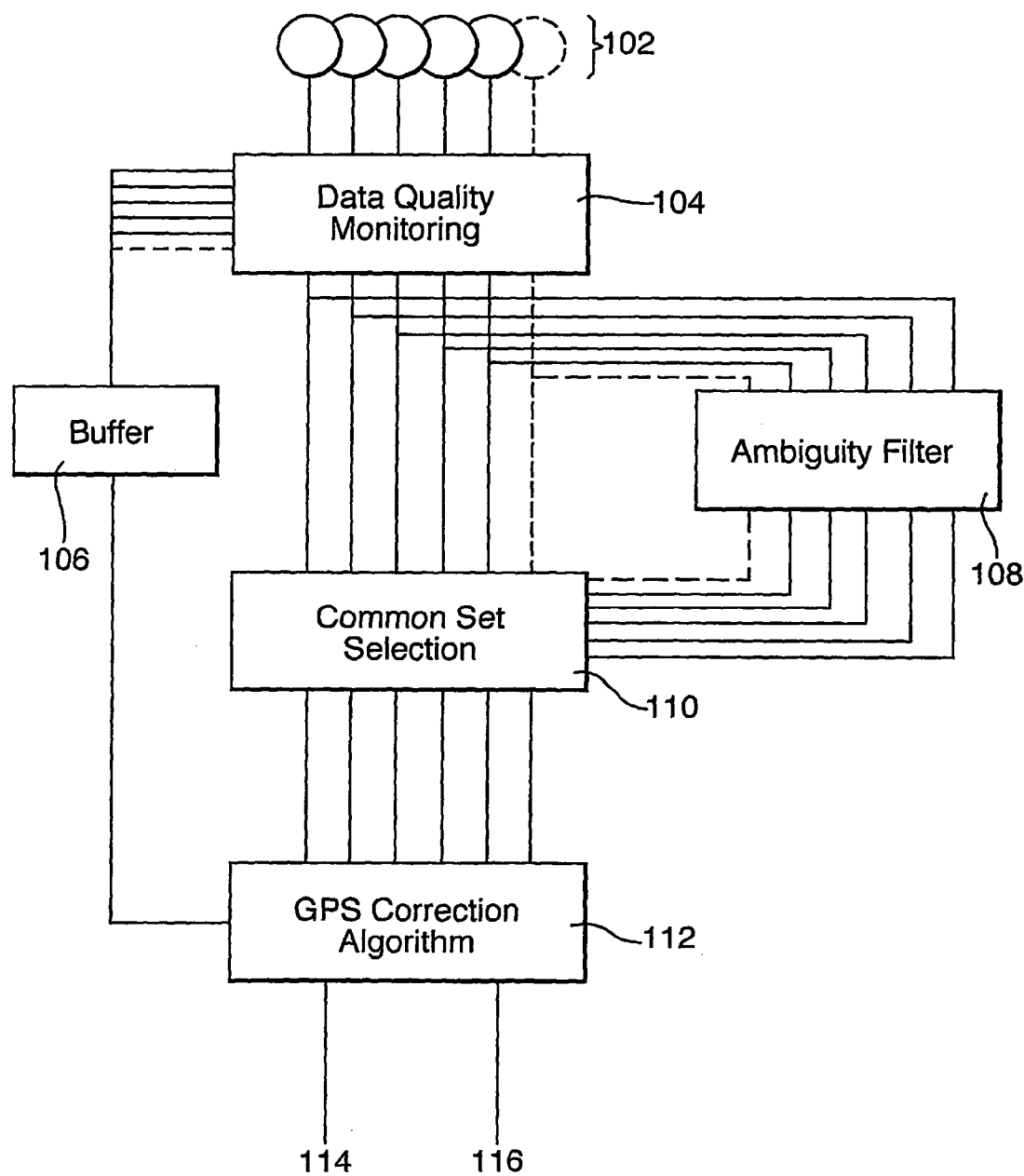
FIG. 1 is an overview of an exemplary shipboard correction system

Referring to FIG. 1, Each of a plurality of GPS receivers 102 provides GPS data for quality monitoring 104. Up to $M_{Tot}$ receivers may produce Pseudorange (PSR), Doppler and ADR measurements from up to $N_{Tot}$ satellites, at each GPS transmission frequency, making $M_{Tot} \times N_{Tot}$ channels per frequency in total. Quality monitoring may include for example an acceleration step test to detect discontinuities or excessive acceleration on a given channel, or a Carrier Smoothed Code (CSC) innovation test. Ephemeris data from each of the receivers is passed to an ephemeris buffer 106, where similar quality monitoring may occur.

The GPS data is also passed to ambiguity filter 108 which produces double differenced ambiguity estimates as will be described in more detail below.

The GPS data and the double differenced ambiguities are analysed at 110 where a common set of channels are chosen, which have not been rejected by data quality monitoring and which have available double differenced ambiguity estimates. The set is chosen to maximise the number of viable channels included.

Once the common set is determined, the data is processed at 112 to produce GPS corrections 114 and B values 116 as will be described with reference to FIG. 3.

Figure 2:
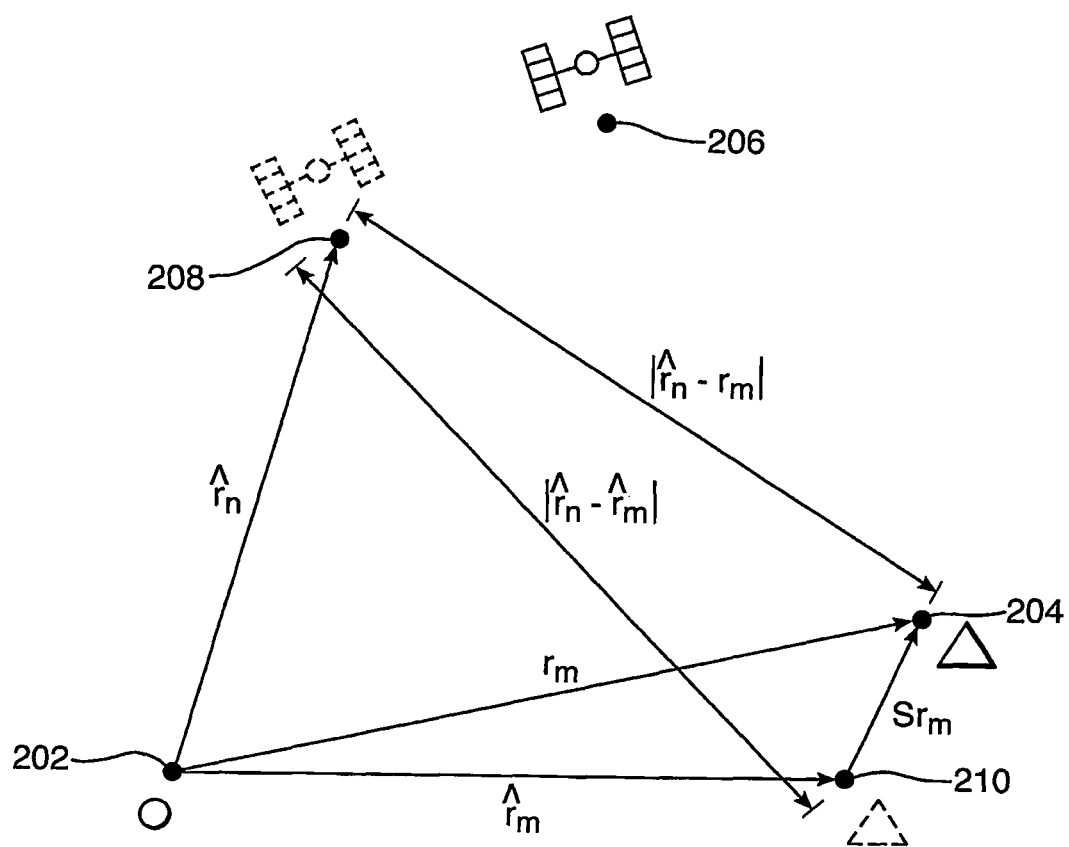
FIG. 2 illustrates relative position vectors of a base station reference receiver and a GPS satellite.

In FIG. 2, an origin 202 defines an inertial reference frame. A GPS receiver 204 has true vector position $r_m$ and a GPS satellite 206 has an unknown true vector position, however an assumed vector position $\hat{r}_n$ is assigned as shown by 208. Similarly, since in applications having a moving base the true vector position of a receiver may not be known, an initial estimate $\hat{r}_m$ is assigned as indicated by 210. The initial estimate might be found for example using a simple least-squares estimate of the receiver position, using code pseudorange measurements from a single GPS epoch only The common set of GPS measurements includes M base station reference receivers and N GPS satellites, such that each receiver in the common set has obtained GPS measurements for each satellite in the common set. Different common sets might be chosen for code pseudorange and ADR measurements, or for different GPS frequencies, so that the appropriate values of M and N and the appropriate common set should be used in each case.

The GPS measurements by receiver m for satellite n and GPS frequency f are:

$$\tilde{P}_{nmf} = |\hat{r}_n - r_m| + \Delta_{nmfP}$$

$$\tilde{A}_{nmf} = |\hat{r}_n - r_m| + \Delta_{nmfA} + a_{nmf} \qquad 1.1$$

where $\tilde{P}$ are the code pseudorange measurements, and $\tilde{A}$ are the ADR measurements. $\hat{r}_n$ is the assumed vector position of satellite n, while $r_m$ is the true vector position of receiver m (expressed in an inertial frame of reference). $a_{nmf}$ is the ambiguity in the ADR measurement (an integer multiple of the corresponding carrier wavelength), and $\Delta_{nmfP/A}$ are errors, including measurement noise as well as spatially correlated errors. Errors in the assumed position of satellite n (ephemeris errors) are included in $\Delta_{nmfP/A}$.

Subtracting the expected satellite-receiver separation, using an initial estimate $\hat{r}_m$ for the position of each reference receiver, gives component correction values:

$$P_{nmf}' = \tilde{P}_{nmf} - |\hat{r}_n - \hat{r}_m| \approx -\hat{e}_n \cdot \delta r_m + \Delta_{nmfP}$$

$$A_{nmf}' = \tilde{A}_{nmf} - |\hat{r}_n - \hat{r}_m| \approx -\hat{e}_n \cdot \delta r_m + \Delta_{nmfA} + a_{nmf} \qquad 1.2$$

where:

$$r_m = \hat{r}_m + \delta r_m \qquad 1.3$$

$$\hat{e}_n \approx \hat{e}_{nm} = \frac{\hat{r}_n - \hat{r}_m}{|\hat{r}_n - \hat{r}_m|} \text{ for all } m$$

Here it is assumed that the angle subtended by the set of reference receivers at the GPS satellites is small. Known satellite clock errors can also be eliminated at this stage, as can models of the effects on signal propagation of the atmosphere.

By averaging over the common set in the known fashion, the code pseudorange GPS correction can be constructed:

$$\tilde{P}_{nf} = \frac{1}{M} \sum_m \left( P_{nmf}' - \frac{1}{N} \sum_{n'} P_{n'mf}' \right) \qquad 1.4$$

giving $$\tilde{P}_{nf} = -\hat{e}_n \cdot \delta r + C_{nfP} + \frac{1}{M} \sum_m R_{nmfP} - X_{fP} \qquad 1.5$$

where the sums run over all receivers or satellites in the common set, if:

$$\delta r = \frac{1}{M} \sum_m \delta r_m \qquad 1.6$$

-continued $$X_{fP} = \frac{1}{N}\sum_{n}\left(-\hat{e}_n \cdot \delta r + C_{nfP} + \frac{1}{M}\sum_{m} R_{nmfP}\right)$$

$$\Delta_{nmfP} = C_{nfP} + R_{nmfP}$$

where $C_{nfP}$ represents correlated errors, which do not vary significantly between the reference receivers, and $R_{nmfP}$ represents random (or other) errors which can vary between receivers. Thus the random errors are reduced by the averaging process in forming the corrections, while the correlated errors take values typical of the base station as a whole.

The term $X_{fP}$ eliminates receiver clock errors, which have a large magnitude and which can vary significantly over time. The remaining errors in Equation 1.4 are relatively small, and so the removal of these receiver clock errors allows integrity monitoring of the GPS corrections.

In a ground based system, the reference receiver positions $\hat{r}_m$ can be accurately surveyed, and then $\delta r \approx 0$. However, if the base station is not static it is not possible to determine $\hat{r}_m$ exactly beforehand, and in this case the GPS corrections include the position offset $\delta r$. This relates to the centroid of the reference receiver positions, and so the GPS corrections relate to this centroid position:

$$r_{centroid} = \frac{1}{M}\sum_{m}\hat{r}_m + \delta r \qquad 1.7$$

As noted previously however, Equation 1.4 is not directly applicable to ADR measurements. Therefore the ADR correction is constrained to be an integer multiple of the carrier wavelength by expressing it in the form:

$$\tilde{A}_{nf} = \qquad 1.8$$

$$\frac{1}{M}\sum_{m}\left[(A'_{nmf} - \delta a_{nmf}^{p_0 q_0} + c_{nf}) - \frac{1}{N}\sum_{n'}(A'_{n'mf} - \delta a_{n'mf}^{p_0 q_0} + c_{n'f})\right]$$

giving $$\tilde{A}_{nf} = -\hat{e}_n \cdot \delta r + C_{nfA} + \frac{1}{M}\sum_{m} R_{nmfA} + a_{nf} - X_{fA} \qquad 1.9$$

with $$X_{fA} = \frac{1}{N}\sum_{n}\left(-\hat{e}_n \cdot \delta r + C_{nfA} + \frac{1}{M}\sum_{m} R_{nmfA} + a_{nf}\right) \qquad 1.10$$

$$\Delta_{nmfA} = C_{nfA} + R_{nmfA}$$

analogously to Equation 1.6, and the n-dependent part of the contribution to Equation 1.8 from the carrier phase ambiguities is:

$$a_{nf} = a_{nq_0 f} + c_{nf} \qquad 1.11$$

for some choice of satellite-receiver pair $(p_0, q_0)$, and is an integer multiple of the carrier wavelength. The 'double-differenced' reference receiver ambiguities:

$$\delta a_{nmf}^{p_0 q_0} = a_{nmf} - a_{nq_0 f} - a_{p_0 mf} + a_{p_0 q_0 f} \qquad 1.12$$

$$= \delta a_{nmf}^{u_0 v_0} - \delta a_{nq_0 f}^{u_0 v_0} - \delta a_{p_0 mf}^{u_0 v_0} + \delta a_{p_0 q_0 f}^{u_0 v_0}$$

can be found as discussed below. As noted above, the common set should be chosen so that this double-differenced ambiguity is available for all required channels.

Such a correction derivation with ambiguity compensation is illustrated in FIG. 3. For a given receiver m, ADR GPS measurements from each satellite in the common set are taken at 302. The expected satellite receiver separation is subtracted at 304, according to equation 1.2 to give component correction values, from which double differenced ambiguities are subtracted (and appropriate offsets added) at 306. The resulting values are averaged across all satellites in the set at 308, and the result provided at the negative input of 310.

The ADR GPS measurement for satellite n undergoes a similar process as illustrated at 312 and 314, and is provided at the positive input of subtractor 310. The output of 310 is then provided to be averaged at 316.

An analogous process is performed for each of the remaining receivers in the common set, as illustrated by 320, 322, 324. Each of the results is provided at 316 and the average across all receivers in the set is derived, to provide the output correction for satellite n.

The ambiguity $a_{nf}$ in Equation 1.9 is constructed to be an integer multiple of the carrier wavelength (namely the ambiguity of the ADR measurements of receiver $q_0$ for the same satellite, offset by $c_{nf}$). Occasionally it will be necessary to change the pair $(p_0, q_0)$, for example if the common set changes. Cycle slips in the ADR correction can be avoided by adjusting $c_{nf}$ to compensate: if there is a change $(p_0, q_0) \rightarrow (p_1, q_1)$, then $c_{nf}$ should be changed from $c_{nf}^-$ to $c_{nf}^+$ according to:

$$c_{nf}^+ = c_{nf}^- + \delta a_{nq_0 f}^{p_1 q_1} \qquad 1.13$$

giving $$a_{nf}^+ = a_{nq_1 f} + c_{nf}^+ - (n\text{-independent terms}) = a_{nq_0 f} + c_{nf}^- \qquad 1.14$$

noting that contributions to $c_{nf}$ which are common to all satellites cancel when the average over satellites is subtracted in Equation 1.8. $c_{nf}$ should be initialised to an integer multiple of the carrier wavelength (e.g. zero).

It is also noted that:

$$\frac{1}{N}\sum_{n'}\tilde{P}_{n'f} = 0, \quad \frac{1}{N}\sum_{n'}\tilde{A}_{n'f} = 0 \qquad 1.15$$

i.e. the corrections are not all linearly independent. If necessary, the common components $X_{fP}$ and $X_{fA}$ can be removed by 'differencing' the corrections against a reference satellite before they are processed further The 'double-differenced' ambiguities:

$$\delta a_{nmf}^{u_0 v_0} = a_{nmf} - a_{nv_0 f} - a_{u_0 mf} + a_{u_0 v_0 f} \qquad 1.16$$

are determined, for some choice of satellite-receiver reference channel $(u_0, v_0)$, by an ambiguity filter as is known in the art, using GPS measurements from the reference receivers. Typically, a 'float' Kalman filter is run, with a state vector which includes the ambiguities and also parameters which represent correlated error states (e.g. atmospheric errors) and the receiver positions. When sufficient information has been collected by the Kalman filter, the space of the double-differenced integer ambiguities (Equation 1.16) can be searched to find the most probable set of ambiguities. The probability that the chosen ambiguities are correct should be checked, to ensure that the solution meets any integrity requirements.

With regard to determining double differenced ambiguities, reference is directed to P J G Teunissen, "Towards a Unified Theory of GNSS Ambiguity Resolution", Journal of Global Positioning Systems Vol 2 p 1 (2003), and P de Jonge, C Tiberius, "The LAMBDA method for Integer Ambiguity Estimation: Implementation Aspects", LGR Series 12, Delft Geodetic Computing Centre (1996).

The relative GPS filter uses the corrections, Equations 1.4 and 1.8, together with rover GPS measurements which are of the form of Equation 1.2. and combines the data in the form:

$$\check{P}'_{nf(rover)} = -\hat{e}_{n(rover)} \cdot \delta r_{(rover)} + C_{nfP(rover)} + R_{nfP(rover)} \quad 1.17$$

$$\tilde{A}'_{nf(rover)} = -\hat{e}_{n(rover)} \cdot \delta r_{(rover)} + C_{nfA(rover)} + R_{nfA(rover)} + a_{nf(rover)}$$

$$\check{P}_{nf} = -\hat{e}_{n(base)} \cdot \delta r_{(base)} + C_{nfP(base)} + \frac{1}{M}\sum_m R_{nmfP(base)} - X_{fP}$$

$$\tilde{A}_{nf} =$$

$$-\hat{e}_{n(base)} \cdot \delta r_{(base)} + C_{nfA(base)} + \frac{1}{M}\sum_m R_{nmfA(base)} + a_{nf(base)} - X_{fA}$$

These measurements can be used to estimate the positions of the rover and base station, together with other parameters which describe various contributions to the systematic errors C (for example, parameters describing atmospheric properties), and the ambiguities a. In particular, correlations between $C_{(rover)}$ and $C_{(base)}$ can be exploited to obtain high accuracy estimates of the relative position offset:

$$\delta r_{(rover)} - \delta r_{(base)} \quad 1.18$$

The relative position of the rover GPS antenna and the centroid of the base station antennas can then be found by adding:

$$\hat{r}_{(rover)} - \frac{1}{M}\sum_m \hat{r}_{m(base)} \quad 1.19$$

If necessary, the common components $X_{fP}$ and $X_{fA}$, and errors in the rover and base station measurements correlated between different satellites (e.g. receiver clock errors), can be eliminated by differencing, i.e. identifying a reference satellite $n_0$ and forming $$\Delta \tilde{P}_{nf(rover)}' = \tilde{P}_{nf(rover)}' - \tilde{P}_{n0f(rover)}'$$

$$\Delta \tilde{A}_{nf(rover)} = \tilde{A}_{nf(rover)} - '\tilde{A}_{n0f(rover)}$$

$$\Delta \check{P}_{nf} = \check{P}_{nf} - \check{P}_{n0f}$$

$$\Delta \tilde{A}_{nf} = \tilde{A}_{nf} - \tilde{A}_{n0f}$$

An ambiguity resolution method can be used to 'fix' the ambiguity states to integer values, resulting in a very high accuracy relative position estimate.

In general, the position of the rover will be required relative to a desired reference point in the base station, rather than relative to the centroid of the base station GPS antennas. For example, in navigation of an aircraft relative to an aircraft carrier, the aircraft position is required relative to the flight deck. The vectors or 'lever arms' between the reference point and the antennas can be determined, for example using knowledge of their relative position in the base station body frame of reference, and knowledge of the base station attitude using an inertial navigation system. However, these lever arms are liable to include errors, caused for example by errors in surveying the antenna positions, thermal expansion or flexure of the base station, and errors in the INS estimate of attitude. For example, considering an aircraft carrier deck over 200 m long, an attitude error of 2 mrad over a lever arm length of 100 m gives a positional error of approximately 20 cm, which is highly significant on the scale of relative carrier phase GPS errors.

In prior art techniques, such as JPALS (see: ARINC, "Sea Based Joint Precision Approach and Landing System (JPALS) Ship System Performance Specification", SRGPS-SPSS-0005-A v 1.5, Jun. 25, 2004), base station GPS measurements are related to the reference point before the relative GPS position is determined. This results in all of the relative measurements being adversely affected by these errors. Since the carrier phase ambiguities must be known to an accuracy greater than the wavelength prior to being resolved onto integer values, these lever arms may make the ambiguity fixing process significantly more difficult.

The present invention affords a more straightforward solution. The GPS estimation and ambiguity fixing is completed, and the rover position estimated relative to the centroid of the base station receivers, before the lever arm information is introduced. Although the centroid is determined solely by the physical arrangement of base station receivers, and may not be a useful reference for a given application, such a relative position estimate can be free of 'lever arm' errors. The position relative to a desired reference point can be found subsequently, using the average of the reference receiver lever arms. Allowance must be made for the change in the position of the centroid if the base station common set changes, since the calculation of this change will be affected by the lever arm errors.

It will be understood that the present invention has been described above purely by way of example, and modification of detail can be made within the scope of the invention. Although GPS has been used as an example, it will be understood that the invention is applicable to any appropriate satellite based navigation system, either alone, or in conjunction with other measurement systems, for example inertial techniques. Furthermore, while satellite measurements have been described, the skilled person will appreciate that other types of measurements subject to phase ambiguity, are equally applicable.

Each feature disclosed in the description, and (where appropriate) the claims and drawings may be provided independently or in any appropriate combination.

The invention claimed is:

1. A method for deriving a correction value $A_{nf}$ for a phase-based satellite navigation measurement for a satellite n, from a common set of a plurality of base station reference receivers M and a plurality of satellites N, said method comprising obtaining, for each receiver in said set, phase-based range measurements from said plurality of satellites, and constraining the phase ambiguity $a_{nf}$ in the derived correction value to be an integer multiple of the carrier wavelength $\lambda$, wherein component correction values $A'_{nmf}$ are averaged over all base station receivers and all satellites in the common set, and wherein double differenced ambiguities $\delta a$ are subtracted from each component correction value prior to averaging.

2. The method of claim 1, further comprising:
for each base station reference receiver, establishing a component correction value $A'_{nmf}$ for each of a set of satellite measurements, subtracting double differenced ambiguities $\delta a$ from each of said component values and averaging over all satellites in the set to produce a first intermediate value,
for each base station reference receiver, establishing a component correction value $A'_{nmf}$ for measurement for said satellite n, subtracting the double differenced ambiguity corresponding to said base station and said satellite n, and subtracting said first intermediate value to produce a second intermediate value; and
averaging said second value over each base station in a set, to produce a final correction value $A_{nf}$.

3. A method according to claim 1, wherein said double differenced ambiguities $\delta a$ are offset by an integer multiple of the carrier wavelength $c_n$.

4. A method according to claim 3, wherein said double differenced ambiguities are determined relative to a chosen satellite-receiver reference pair $p_0 q_0$, and wherein the phase ambiguity $a_{nf}$ in the correction value is equal to the ambiguity for said chosen reference receiver $q_0$, offset by constant $c_n$.

5. A method according to claim 4, wherein said constant $c_n$ is adjusted to compensate for a change of reference pair $p_0q_0$.

6. A method according to claim 5, wherein if said reference pair $p_0q_0$ is changed to reference pair $p_1q_1$, then $c_n$ is incremented by the double differenced ambiguity for said previous reference receiver $q_0$ determined relative to satellite-receiver reference pair $p_1q_1$.

7. A method according to claim 1, wherein said phase correction value is determined as:

$$A_{nf} = \frac{1}{M} \sum_m \left[ (A'_{nmf} - \delta a_{nmf}^{p_0 q_0} + c_{nf}) - \frac{1}{N} \sum_{n'} \left( A'_{n'mf} - \delta a_{n'mf}^{p_0 q_0} + c_{n'f} \right) \right]$$

where:
- $A_{nf}$ is the phase correction value for satellite n at frequency f
- M is the total number of base station reference receivers in the common set
- N is the total number of satellites in the common set
- $A'_{nmf}$ is the component correction value for receiver m for satellite n at frequency f
- $\delta a_{nmf}^{p_0 q_0}$ is the double differenced reference receiver ambiguity for receiver m for satellite n at frequency f relative to a chosen satellite receiver pair $p_0q_0$
- $c_{nf}$ is an integer multiple of the carrier wavelength.

8. A method according to claim 1, wherein said correction value is used to determine an estimate of position of an object relative to an average of the positions of the base station receivers, and wherein said estimate is subsequently transformed to be relative to a selected base station reference point.

* * * * *